UNITED STATES PATENT OFFICE.

WILLIAM E. BRADLEY, OF FRANKFORT, KENTUCKY.

PROCESS OF MAKING WHISKY.

SPECIFICATION forming part of Letters Patent No. 495,956, dated April 25, 1893.

Application filed June 25, 1889. Serial No. 315,520. (No specimens.)

*To all whom it may concern:*

Be it known that I, WILLIAM E. BRADLEY, of Frankfort, Franklin county, Kentucky, have invented a new and Improved Process of Making Whisky, of which the following is a full, true, and exact description.

My invention relates to an improved process of making whisky, in which the yield per bushel of grain is increased.

The object of my invention is to use back in subsequent processes portions of the refuse of the grain which are now wasted.

My invention is designed to accomplish in another way the results described in the patent to M. J. Allen and myself of August 22, 1882, No. 263,087.

I have discovered that it is possible to return the sugar, starch, yeast and other valuable particles, usually rejected, with the slop or spent beer by returning the same with a portion of spent beer from which the bran, chaff and other coarse or refuse matters have been rejected or separated. The principle of the present process is to separate in the fermenter a portion of the beer not containing refuse particles, distill it separately, and use the resulting slop in subsequent repetitions of the process of whisky making. In the process of fermentation the carbonic acid or other gas rising through the beer maintains a gentle agitation, which causes the fine particles to be disseminated through the upper part of the fermenting mass, whereas the heavier particles pass to the bottom and rest there. I propose, therefore, to separate, at or about the end of the fermenting period a portion of the beer containing these fine valuable particles, but not containing the refuse matter, separately distill it, and use the resulting slop into subsequent repetitions of the process of whisky making, as, for instance, in filling up the fermenters, washing out the mash-tubs, or in any other manner in which it can be used in place of water. The principle of my discovery, therefore, consists in utilizing the discriminating settling action going on in the fermenting tub which will allow the heavier particles to settle, while the lighter and valuable particles are maintained in suspension.

It is likewise important, as has been previously pointed out in the patent to M. J. Allen and myself, hereinabove referred to, to rapidly and immediately cool the slop so as to preserve it from the action of diseased ferments; and I propose, therefore, to treat the slop from the separated beer by rapidly cooling the same, and either returning it immediately with the valuable particles in suspension, or, if it be allowed to rest, causing such agitation of the slop before its return, either by a mechanical agitator or by the motion of the slop, as will cause the return of the valuable particles together with the slop. In practice I find that about one-half the slop produced can be returned, and therefore in practice I draw off from the fermenting tub or tubs about the upper one-half of the contents, which can be done by any well known contrivance, as, for instance, by a series of holes bored in the side of the tub and successively opened down to the point desired. The beer should be drawn off at about the end of the fermenting period and before the fine particles have had an opportunity to settle completely from the surrounding beer; and this beer should be promptly passed to the still without permitting these fine particles to settle before distillation. It is obvious that by this process no additional exposure to diseased ferments is necessitated beyond that occurring in the ordinary process of whisky making; and I likewise avoid the necessity of a mechanical separation by sieving or similar means.

What I claim as my invention, and desire to secure by Letters Patent, is—

1. The improvement herein described in the art of whisky making, which consists in removing at or near the end of the fermenting period a portion of the beer containing valuable particles in suspension and from which refuse particles have settled, distilling the same separately from the rest of the beer, and using the slop obtained from this distillation in subsequent repetitions of the process of whisky making, substantially as described.

2. The improvement herein described in the art of whisky making, which consists in removing at or near the fermenting period a portion of the beer containing valuable particles in suspension and from which refuse particles have settled, distilling the same separately from the rest of the beer, rapidly cooling the same, and using the slop obtained from this distillation in subsequent repetitions of the process of whisky making, substantially as described.

3. The improvement herein described in the art of whisky making, which consists in removing at or near the fermenting period a portion of the beer containing valuable particles in suspension and from which refuse particles have settled, distilling the same separately from the rest of the beer, rapidly cooling the same and causing such an agitation as to maintain the valuable particles in suspension, and using the slop obtained from this distillation in subsequent repetitions of the process of whisky making, substantially as described.

In testimony whereof I have signed my name to this specification in the presence of two subscribing witnesses.

WILLIAM E. BRADLEY.

Witnesses:
G. F. BERRY,
W. H. JEFFRIES.